June 14, 1966 G. A. WOOD, JR 3,255,981
HYDRAULIC FISHING REEL BRAKE
Filed Oct. 3, 1962 3 Sheets-Sheet 1

INVENTOR.
GARFIELD A. WOOD, JR.
BY
Lane, Aitken & Dunner
ATTORNEYS

June 14, 1966  G. A. WOOD, JR  3,255,981
HYDRAULIC FISHING REEL BRAKE
Filed Oct. 3, 1962  3 Sheets-Sheet 2
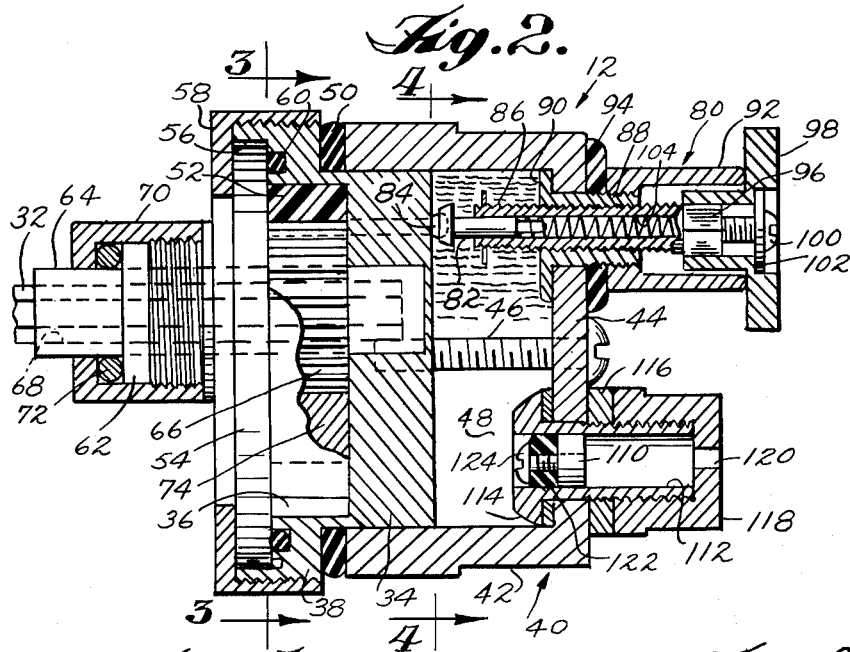
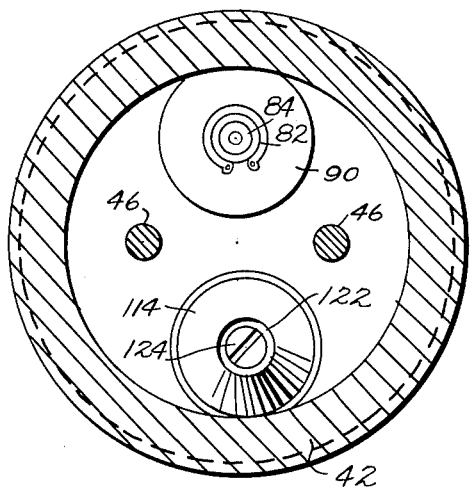
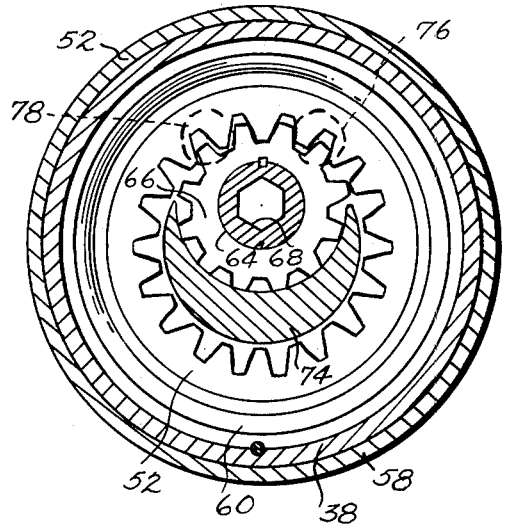
INVENTOR.
GARFIELD A. WOOD, JR
BY
Lane, Aitken & Dunner
ATTORNEYS June 14, 1966 G. A. WOOD, JR 3,255,981
HYDRAULIC FISHING REEL BRAKE
Filed Oct. 3, 1962 3 Sheets-Sheet 3
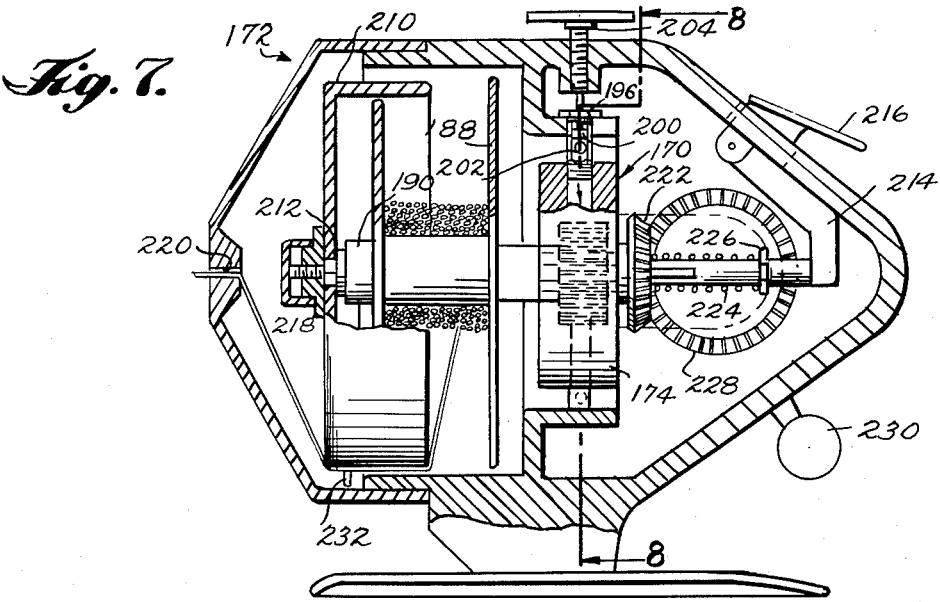
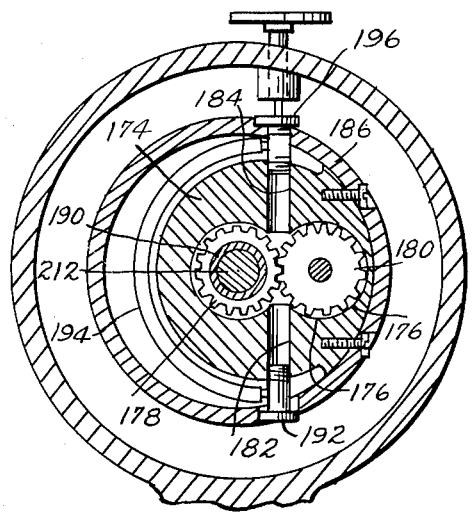
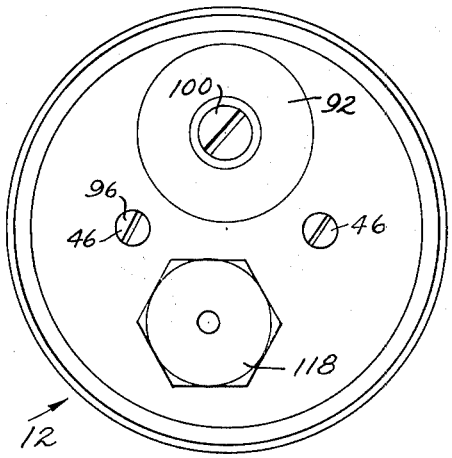
INVENTOR.
GARFIELD A. WOOD, JR
BY
Lane, Aitken & Dunner
ATTORNEYS United States Patent Office 3,255,981
Patented June 14, 1966

3,255,981
HYDRAULIC FISHING REEL BRAKE
Garfield A. Wood, Jr., 4565 Sabal Palm Road,
Miami, Fla.
Filed Oct. 3, 1962, Ser. No. 228,163
14 Claims. (Cl. 242—84.5)

The present invention relates to fishing reels, and more particularly to a fishing reel having a hydraulic braking mechanism.

Most fishing reel brakes comprise a friction material pressed against a rotating element such as the side flange of the spool of the reel to retard rotation of the spool by a fish running out the line. Usually some type of adjustment is also provided to enable the fisherman to increase or decrease the braking force to assist in fighting the fish. These prior art fishing reel brakes do not provide a smooth and even braking action at all times since they are subject to change due to heat, wear and moisture. Of course, an uneven or jerky braking action can break the fishing line.

It is one object of the present invention to provide a hydraulic fishing reel brake which applies a completely smooth braking action at all times without roughness or change due to wear, heat or moisture.

It is another object of the invention to provide a hydraulic brake for a fishing reel comprising a closed hydraulic system completely filled with fluid and having a pump actuated in response to rotation of the spool.

It is a further object of the invention to provide a hydraulic brake for a fishing reel as described above wherein the braking force applied to the spool can be varied by adjusting the maximum pressure of the closed hydraulic system by means of a simple pressure relief valve.

It is a still further object of the invention to provide a hydraulic brake for a fishing reel which is rugged in construction, dependable in operation, and economical to manufacture.

FIG. 2 is an enlarged sectional view of the hydraulic brake illustrated in FIG. 1;

FIG. 3 is a sectional view taken along the line 3—3 of FIG. 2;

FIG. 4 is a sectional view taken along the line 4—4 of FIG. 2;

FIG. 5 is an end view of the right end of the structure illustrated in FIG. 2;

FIG. 7 is a sectional view of a closed face fishing reel with a hydraulic brake embodying features of the present invention; and FIG. 8 is a sectional view taken along the line 8—8 of FIG. 7.

Figure 1:
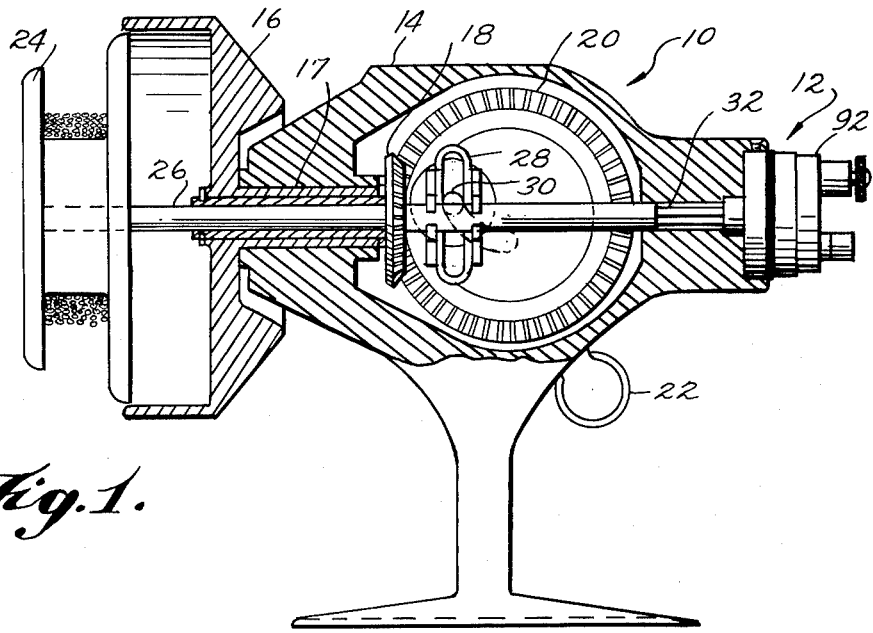
FIG. 1 is a sectional view of an open face spinning reel with a hydraulic brake embodying features of the present invention.

Referring to FIG. 1, an open faced spinning reel 10 is illustrated having a hydraulic brake 12 embodying features of the present invention mounted on the rear end thereof. The spinning reel 10 is conventional and briefly comprises a body 14 having a pickup member 16 rotatably journaled on the forward end thereof by a bushing 17 extending therefrom. A small bevel gear 18 is fixed to the bushing 17 in position to mesh with a large bevel gear 20 rotated directly by the handle 22 of the fishing reel. A spool 24 is fixed to the end of a shaft 26 extending through the pickup member 16 and small bevel gear 18 with the right end thereof journaled in the rear end of the housing 14. Eccentric pin 30 projects from the inner face of gear 20 to engage follower 28, rotatable on but axially movable with shaft 26, to convert rotation of gear 20 into reciprocation of shaft 26 and spool 24 to achieve level winding of the line. The shaft 26 is free to rotate relative to the mechanism 28, but is reciprocated by the mechanism so that it moves in and out of the bale element 16 to provide a level wind feature.

A hexagonal end portion 32 is provided on the right end of the shaft 26 which extends into the hydraulic brake 12 to slidably key the shaft to the hydraulic brake. With this construction the hydraulic brake 12 normally prevents rotation of the shaft 26 as will be described so that the fishing line will be level wound about the spool 24 when the handle 22 is rotated to rotate the pickup member 16 and reciprocate the spool 24 relative thereto.

Referring to FIGS. 2-5, the hydraulic brake 12 comprises a ported block 34 having a circular recess 36 in the left face thereof and an externally threaded flange 38 surrounding the recess. An end cap 40 having a cylindrical wall 42 and an end wall 44 is slidably positioned over the port plate 34 and retained thereon by a plurality of elongated bolts 46 extending through the end wall 44 and threadably engaging the ported block 34. The space within the end cap provides a reservoir 48 which is filled with hydraulic fluid, as will be described, and a suitable O-ring 50 is positioned between the flange 38 and the end of the cylindrical wall 40 to seal the fluid within the reservoir 48.

An internal ring gear 52 preferably made of a tough, low-friction plastic is rotatably journaled within the recess 36 in the left face of the ported block 34 and is restrained against axial movement by a cover plate 54 positioned within an enlarged counterbore 56 in the face of the flange 38. The cover plate 54 is retained in position by a ring 58 screwed on the externally threaded flange 38 and a suitable O-ring 60 is interposed between the cover plate 54 and the flange 38 to provide a seal therebetween.

An externally threaded bushing 62 is fixed to and projects from the left face of the cover plate 54 to provide a bearing for the left end of a stub shaft 64 with the right end of the stub shaft being rotatably journaled in the ported block 34. A suitable pinion gear 66 is fixed on the stub shaft 64 and meshes with the teeth of the internal ring gear 52 to cooperate therewith to provide a pump, as will be described. The stub shaft 64 has a hexagonal bore 68 opening on the left end thereof for slidably receiving the hexagonal end portion 32 to key the shaft 26 to the stub shaft but enable it to reciprocate relative thereto. A small cap 70 is screwed onto the externally threaded bushing 62 with a suitable O-ring 72 compressed between the end of the cap and the end of the bushing to provide a seal.

As most clearly illustrated in FIGS. 2 and 3, a crescent-shaped element 74 is fixed to and projects from the right face of the cover plate 54 into the space between the pinion gear 66 and internal ring gear 52. The inner curved surface of the crescent element 74 slidably seals against the teeth of the pinion gear 66 and the outer curved surface of the crescent-shaped element slidably seals against the teeth of the internal ring gear 52. When the pinion gear 66 is rotatably driven by the rotation of the shaft 26, as will be described, it drives the ring gear 52 to provide a pumping action to suck fluid from the reservoir 48 through an inlet port 76 in the ported block 34 and pump it back into the reservoir 48 through an exhaust port 78 in the ported block.

A pressure relief valve 80 is mounted in the end wall 44 of the end cap 40 in coaxial alignment with the exhaust port 78. A plunger 82 slidably projects from the end thereof to normally close the exhaust port 78, a small neoprene O-ring 84 being fixed in the end of the plunger 82 to improve the seat against the exhaust port. The plunger 82 is slidably disposed within the bore of an externally threaded sleeve 86 which, in turn, is threadably retained in an internally threaded sleeve 88 having a flange 90 on the inner end thereof engaging the inner surface of the end wall 44. A sleeve nut 92 is screwed on the outer end of the sleeve 88 with a plastic washer 94 interposed between the sleeve nut and the wall 44 to firmly lock the sleeve 88 in the position illustrated in FIG. 2. The right end of the externally threaded sleeve 86 has a plurality of flats 96 thereon and a knurled knob 98 is drivingly connected thereto and retained thereon by a screw 100 and washer 102. With this construction, the threaded sleeve 86 can be advanced and retracted relative to the fixed sleeve 88 to vary the pressure which a spring 104 exerts on the plunger 82 to maintain it seated against the exhaust port 78.

With this arrangement, the maximum fluid pressure that can be developed by the pumping elements (the pinion 66 and ring gear 52) is determined by the adjustable pressure relief valve 80 and the amount of braking action exerted on the spool shaft 26 is proportional to this fluid pressure. Consequently, as a running fish takes line from the spool 24, the spool will be restrained against rotation until the fish exerts enough force on the line to cause the pump to develop enough pressure to unseat the pressure relief valve 80 to enable the fluid to be pumped into the reservoir 48 and additional fluid to be taken in from the reservoir 48 through the inlet port 76. By spring mounting the plunger 82 as illustrated, it will automatically seat and unseat itself to close and open the exhaust port 78 when the pressure developed by the pump falls below and rises above the pressure exerted by the spring 104. Should the pump be actuated very rapidly by a large force exerted on the line by the running fish, the spring mounted plunger 82 will be forced further away from the ported block to enable the fluid to more freely pass from the exhaust port 78. The net result is a smooth hydraulic braking force for resisting the rotation of the spool which braking force can be adjusted easily by the fisherman by simply varying the setting of the pressure relief valve 80 by the knurled knob 98.

In order to compensate for changes in the volume of the fluid within the reservoir 48 in response to temperature changes, for example, a free-floating piston 110 may be slidably positioned within a cylinder 112 having a flange 114 on the inner end thereof so that it may be fixed relative to the end wall 44 by a nut 116 threaded on the right end thereof. A small end cap 118 may be threaded over the right end of the cylinder 112 to engage the nut 116 to lock it in position and an aperture 120 provided in the end thereof to vent the cylinder 112 to atmosphere. With this arrangement, the atmospheric pressure will maintain the floating piston 110 in engagement with the fluid within the reservoir 48 as it expands and contracts in response to the temperature changes. If desired, an O-ring 122 may be fixed on one face of the piston 110 by a screw 124 to improve the seal against the wall of the cylinder 112. Also the floating piston serves as a convenient means for initially filling the reservoir 48 with fluid and adding additional fluid thereto when necessary.

Figure 6:
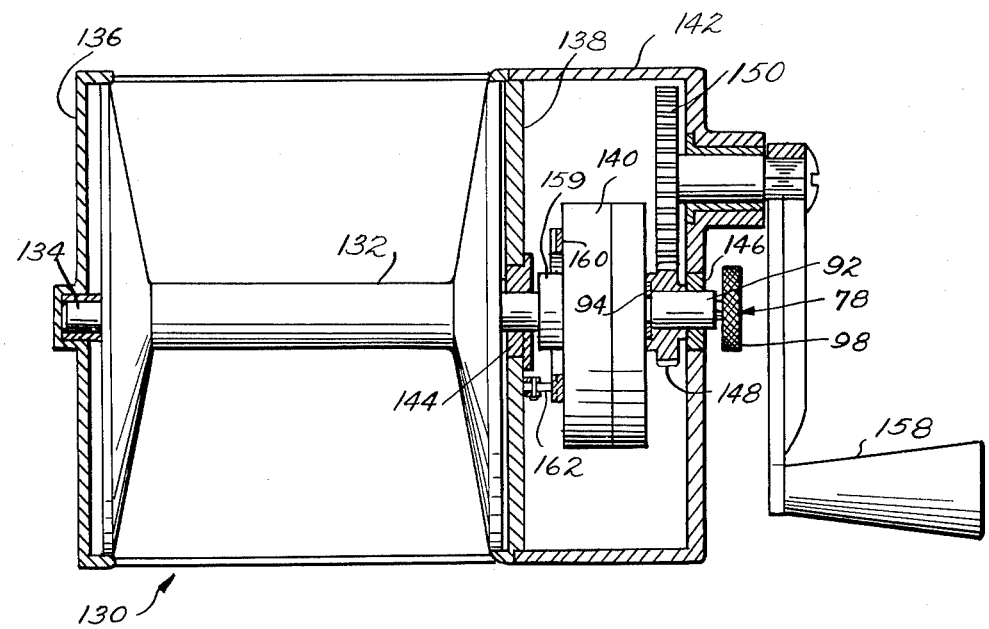
FIG. 6 is a sectional view of another type of fishing reel with a hydraulic brake embodying features of the present invention.

Referring to FIG. 6, another embodiment of the invention is shown comprising a conventional spool-type fishing reel 130 having a spool 132 keyed on a shaft 134 rotatably journaled in end plates 136 and 138, the end plates being interconnected in a conventional manner. A hydraulic brake 140 similar to the hydraulic brake 112 with some minor modifications which will be described is positioned within an end cover 142 secured over the end plate 138. The right end of the shaft 134 extends into a bearing 144 and is drivingly connected to the pinion gear which meshes with the internal ring gear of the pump in the hydraulic brake as previously described. In this embodiment the ported block of the hydraulic brake 140 is modified slightly so that the right end of the exhaust port communicates with the reservoir at a point coaxially aligned with the axis of the pinion gear and spool shaft 134. This enables the pressure relief valve 80 to be positioned in coaxial alignment with the spool shaft 134. The sleeve nut 92 is journaled in a bushing 146 fixed in the end cover 142 to support the right side of the hydraulic brake 140. A pinion gear 148 is rotatably mounted on the sleeve nut 92 and fixed to the housing of the hydraulic brake so that the entire housing can be rotated directly in response to the rotation of the pinion gear 148 by a spur gear 150 which, in turn, is rotated by the handle 158.

In operation, rotation of the handle 158 rotates the housing of the hydraulic brake 140 to rotate the spool shaft 134 directly through a conventional one-way drive mechanism 159 on the left face of the hydraulic brake. However, when the handle 158 is held against rotation to prevent rotation of the brake housing and a running fish exerts a pull on the line to rotate the spool 132, the hydraulic brake functions in the manner described in connection with the embodiment of FIG. 2 to apply a hydraulic braking force on the spool proportional to the maximum pressure developed by the pumping elements in response to the rotation of the spool. As before, this maximum pressure is controlled by the adjustment of the pressure relief valve by the knurled knob 98.

If desired, a ring 160 may be affixed to the housing of the hydraulic brake 140 concentric with the axis of the shaft 134 and having ratchet teeth on the exposed cylindrical face thereof in position to be engaged by a pawl 162 projecting from and pivotally connected to the end plate 138. With this construction, the housing of the hydraulic brake 140 can be freely rotated by the handle 158 to rotate the spool 132 for winding in the fishing line, and the pawl and ratchet ring will prevent rotation of the housing in the opposite direction when a running fish exerts a pull on the line, as previously described.

The pinion gear 148 and spur gear 150 could be positioned on the left side of the hydraulic brake to drive the spool shaft 134 directly through a one-way drive with the housing of the hydraulic brake being fixed against rotation. With this arrangement the shaft could rotate freely in the opposite direction subject only to the braking force applied thereto by the hydraulic brake 140. However the rotation of the spool by the gears 148 and 150 would also be resisted by the brake.

Referring to FIGS. 7 and 8, a different type of hydraulic brake 170 is illustrated in combination with a conventional closed face spinning reel 172. As most clearly illustrated in FIG. 8, the hydraulic brake 170 comprises a gear pump having a housing 174 with a figure eight chamber 176 therein. A pair of meshed pinion gears 178 and 180 are sealingly positioned within the two halves of the figure 8 chamber with an inlet port 182 and an exhaust port 184 formed in the housing 174 in position to communicate with opposed sides of the chamber 176. The housing 174 is fixed to a flange 186 integral with the housing of the spinning reel 172 so as to position the gear 178 in coaxial alignment with the axis of the spool 188. The spool is fixed to a sleeve 190 and the gear 178 is fixed on the right end of the sleeve so that it is directly driven in a clockwise direction as viewed in FIG. 8 when the spool is rotated by a running fish. The gear 178 drives the idler gear 180 to suck fluid from the inlet port 182 and pump it out the exhaust port 184 under pressure. A suitable fitting 192 extends through the flange 186 of the spinning reel and is fixed in the end of the inlet port to enable one end of a neoprene tube 194 to be fixed thereto in a manner to communicate with the inlet port. A somewhat similar fitting 196 is extended through the flange 186 and fixed in the end of the outlet port 184 to enable the other end of the neoprene tube 194 to be fixed thereto for communication with the outlet port. With this construction, the tube 194 can be completely filled with fluid to act as the reservoir and the fluid can circulate from the exhaust port through the tube and into the inlet port when the pump is actuated, and by making the tube of neoprene or the like it will expand and contract to compensate for changes in volume of the fluid. As most clearly illustrated in FIG. 7, a small piston 200 is slidably positioned within the fitting 196 to vary the size of the orifice 202 in the fitting to control the passage of fluid from the exhaust port into the tube 194 and in this manner control the pressure built up by the pump. A threaded knob 204 is connected to the piston 200 for controlling the position thereof.

A rotatable pickup member 210 is fixed to the left end of a shaft 212 which extends through the sleeve 190 with the right end thereof engaged by a lever 214 actuated by a button 216 on the outside of the spinning reel. When the button is depressed the shaft 212 is advanced to snub a nose 218 on the bale element against the portion of the line passing through aperture 220 in the cover plate of the spinning reel to stop a cast in a conventional manner. A small bevel gear 222 is slidably keyed to the shaft 212 and is spring biased against the right face of the housing 174 by a spring 224 disposed about the right end of the shaft and bearing against a snap ring 226 fixed to the shaft. A large bevel gear 228 drives the small bevel gear 222 in response to rotation of the handle 230 to rotate the pickup member 210 to wind the fishing line on the spool 188, and a retractable pin 232 projects from the periphery of the pickup element to engage line for winding it on the spool in a conventional manner.

With this arrangement, the spool is held against rotation by the braking action provided by the hydraulic brake 170 so that the line may be wound thereabout by the rotation of the bale element in response to the rotation of the handle 230. However, should the force on the line exerted by a fish exceed the braking pressure applied by the hydraulic brake, the spool will slip to prevent the line from being broken. As previously described, this braking pressure is controllable by adjusting the knob 204 to assist the fisherman in fighting a fish.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed:

1. In combination, a fishing reel having means thereon for mounting the fishing reel on a fishing rod and a rotatable element which rotates in response to a running fish taking line, and hydraulic brake means for resisting rotation of said rotatable element, said hydraulic brake means comprising a closed hydraulic system completely fillable with hydraulic fluid, said system including a pump therein actuated by the rotation of said rotatable element to pressurize said fluid, and pressure relief valve means responsive to the fluid pressure developed by said pump to open at a predetermined fluid pressure and circulate fluid through said hydraulic brake means.

2. In combination, a fishing reel having means thereon for mounting the fishing reel on a fishing rod and a rotatable element which rotates in response to a running fish taking line, and hydraulic brake means for resisting rotation of said rotatable element, said hydraulic brake means comprising a closed hydraulic system completely fillable with hydraulic fluid, a pump in said system having a rotatable member for pressurizing said fluid, means for drivingly connecting said rotating element to said rotating member whereby the pressure of said fluid increases as the speed of the rotating element increases to provide a braking action for resisting the running out of the line by the fish, and manually adjustable pressure relief valve means responsive to the fluid pressure developed by said pump to open at a predetermined fluid pressure and circulate fluid through said hydraulic brake means.

3. In combination, a fishing reel having means thereon for mounting the fishing reel on a fishing rod and a rotatable element which is rotated in response to a running fish taking line, hydraulic brake means for resisting rotation of said rotatable element when a fish runs out the line, said hydraulic brake means being completely fillable with hydraulic fluid and including a pump having intake and exhaust ports, pressure relief valve means cooperating with said exhaust port and responsive to the fluid pressure developed by said pump to open at a predetermined fluid pressure and circulate fluid through said hydraulic brake means, and means for drivingly connecting said pump to said rotatable element for actuation thereby.

4. The invention as defined in claim 3 including means for compensating for changes in volume of the hydraulic fluid in said brake means.

5. In combination, a fishing reel having means thereon for mounting the fishing reel on a fishing rod and a rotatable element which is rotated in response to a running fish taking line, and hydraulic brake means for resisting rotation of said rotatable element, said brake means comprising a pump having intake and exhaust ports, a fluid reservoir communicating said intake and exhaust ports, pressure relief valve means cooperating with said exhaust port and responsive to fluid pressure developed by said pump to open at a predetermined fluid pressure and circulate fluid through said hydraulic brake means, and means for drivingly connecting said pump to said rotatable element for actuation thereby.

6. The invention as defined in claim 5 wherein said fluid reservoir is provided by a tube of flexible material communicating said intake and exhaust ports with one another.

7. In combination, a fishing reel having means thereon for mounting the fishing reel on a fishing rod and a rotatable element which rotates in response to a running fish taking line, and hydraulic brake means for resisting rotation of said rotatable element, said hydraulic brake means comprising a closed hydraulic system completely fillable with fluid, said system having a pump therein actuated by the rotation of said rotatable element for pressurizing the fluid, and pressure relief valve means responsive to the fluid pressure developed by said pump to open at a predetermined fluid pressure and circulate fluid through said hydraulic brake means, and means for compensating for changes in volume of the fluid.

8. In combination, a fishing reel having means thereon for mounting the fishing reel on a fishing rod and a rotatable element which rotates in response to a running fish taking line, and hydraulic brake means for resisting rotation of said rotatable element, said hydraulic brake means comprising a closed hydraulic system completely fillable with fluid, a pump in said system having a rotatable member for pressurizing said fluid, means for drivingly connecting said rotating element to said rotating member, and normally closed relief valve means in said system on the high pressure side of said pump and responsive to the fluid pressure developed by said pump to open at a predetermined fluid pressure and circulate fluid through said hydraulic brake means.

9. The invention as defined in claim 8 wherein said pump is a positive displacement pump.

10. In combination, a fishing reel having means thereon for mounting the fishing reel on a fishing rod and a rotatable element which is rotated in response to a running fish taking line, hydraulic brake means operatively connected to said rotatable element for resisting rotation of the rotatable element when a fish is running out the line, said hydraulic brake means comprising a housing having a pumping chamber and a fluid reservoir separated by a ported plate, said ported plate having intake and exhaust ports therein communicating said pumping chamber with said reservoir, a rotor in said pumping chamber drivingly connected to said rotatable element for rotation thereby, and a spring-biased pressure relief valve seated against the exhaust port on the reservoir side of said ported plate to normally close off the exhaust port until a predetermined pressure is developed by the rotation of said rotor.

11. In combination, a fishing reel having means thereon for mounting the fishing reel on a fishing rod and a rotatable element which is rotated in response to a running fish taking line, hydraulic brake means for resisting rotation of said rotatable element when a fish runs out the line, said hydraulic brake means being completely fillable with hydraulic fluid and including a pump having intake and exhaust ports, pressure relief valve means cooperating with said exhaust port to prevent the circulation of fluid through said hydraulic brake means until a predetermined fluid pressure is developed by said pump, means for drivingly connecting said pump to said rotatable element for actuation thereby, and means for adjusting the pressure at which said pressure relief valve opens to control the maximum braking action applied to said rotatable element.

12. In combination, a fishing reel having means thereon for mounting the fishing reel on a fishing rod and a rotatable element which is rotated in response to a running fish taking line, hydraulic brake means for resisting rotation of said rotatable element when a fish runs out the line, said hydraulic brake means being completely fillable with hydraulic fluid and including a pump having intake and exhaust ports, pressure relief valve means cooperating with said exhaust port to prevent the circulation of fluid through said hydraulic brake means until a predetermined fluid pressure is developed by said pump, and means for drivingly connecting said pump to said rotatable element for actuation thereby, said pressure relief valve means comprising a spring-biased plunger seated against said exhaust port to normally close it off, and means for varying the spring pressure on said plunger.

13. In combination, a fishing reel having means thereon for mounting the fishing reel on a fishing rod and a rotatable element which rotates in response to a running fish taking line, and hydraulic brake means for resisting rotation of said rotatable element, said hydraulic brake means comprising a closed hydraulic system completely fillable with fluid, a pump in said system having a rotatable member for pressurizing said fluid, means for drivingly connecting said rotatable element to said rotating member, and a normally closed relief valve in said system on the high pressure side of said pump for preventing circulation of the fluid until a predetermined pressure is developed by the pump, said relief valve being spring-biased to its normally closed position and including means for adjusting the biasing force provided by said spring.

14. The invention as defined in claim 1 wherein said rotatable element comprises a rotatable spool, and including one-way drive means drivingly connecting said hydraulic brake means to said spool to rotate the spool directly in one direction without building up fluid pressure in said hydraulic system, and means drivingly connecting said pump to said spool for rotation thereby when the hydraulic means is held stationary and the spool is rotated in a direction opposite to said one direction by a running fish taking the line.

References Cited by the Examiner

UNITED STATES PATENTS

| | | | |
|---|---|---|---|
| 1,987,273 | 1/1935 | Strigl | 188—92 |
| 2,007,279 | 7/1935 | McCleary | 188—92 |
| 2,059,765 | 11/1936 | Adams | 242—84.51 |
| 2,180,566 | 11/1939 | Thompson | 242—84.51 |
| 2,246,923 | 6/1941 | Meunier | 188—92 X |
| 2,502,523 | 4/1950 | Irwin | 188—92 |
| 2,607,548 | 8/1952 | Hollander | 242—84.52 |
| 2,687,855 | 8/1954 | Shakespeare et al. | 242—84.21 |
| 2,813,601 | 11/1957 | Bourgues | 242—84.52 |
| 3,034,604 | 5/1962 | Holmes | 242—84.5 X |
| 3,061,230 | 10/1962 | Gayle | 242—84.2 |

FOREIGN PATENTS

| | | |
|---|---|---|
| 750,587 | 6/1956 | Great Britain. |
| 576,582 | 5/1958 | Italy. |

MERVIN STEIN, *Primary Examiner.*

RUSSELL C. MADER, *Examiner.*

B. S. TAYLOR, *Assistant Examiner.*